United States Patent [19]

Salerno

[11] 4,208,176

[45] Jun. 17, 1980

[54] TIME INDEPENDENT CYCLE CONTROL FOR PLASTIC INJECTION MOLDING MACHINES

[75] Inventor: Joseph F. Salerno, Meriden, Conn.

[73] Assignee: Litton Industrial Products, Inc., New Britain, Conn.

[21] Appl. No.: 833,536

[22] Filed: Sep. 15, 1977

Related U.S. Application Data

[63] Continuation-in-part of Ser. No. 587,043, Jul. 16, 1975, abandoned.

[51] Int. Cl.² ............................................. B29F 1/06
[52] U.S. Cl. ................................... 425/139; 425/144; 425/149
[58] Field of Search ............... 425/144, 145, 139, 149, 425/156, 157, 163, 164, 165, 166, 135; 264/40

[56] References Cited

U.S. PATENT DOCUMENTS

| | | | |
|---|---|---|---|
| 2,632,207 | 3/1953 | Mahla | 425/144 |
| 3,339,227 | 9/1967 | Ehrenfreund | 425/144 |
| 3,718,721 | 2/1973 | Gould et al. | 425/144 X |
| 3,767,339 | 10/1973 | Hunkar | 425/149 X |
| 3,840,312 | 10/1974 | Paulson et al. | 425/149 |
| 3,941,534 | 3/1976 | Hunkar | 425/149 X |

*Primary Examiner*—William R. Briggs
*Attorney, Agent, or Firm*—Brian L. Ribando

[57] ABSTRACT

A cycle control for plastic injection molding machines. All time-responsive machine controls are eliminated by initiating or terminating machine functions in response to actual, physical properties experienced by the machine or by the plastic or in the mold, rather than in response to elapsed-time intervals. Means are provided for changing the injection pressure to the holding pressure when the pressure in the mold cavity reaches a predetermined pressure, means are provided for ending the holding pressure and initiating the cold/cure portion of the cycle in response to actual, physical conditions of the plastic in the mold, such as pressure or temperature, and means are provided for opening the clamp to eject the molded part and thus end the cold/cure portion of the cycle in response to actual, physical properties of the plastic in the mold, such as pressure or temperature. The machine cycle is thereby completely independent of time, and cycle time may be minimized.

1 Claim, 2 Drawing Figures

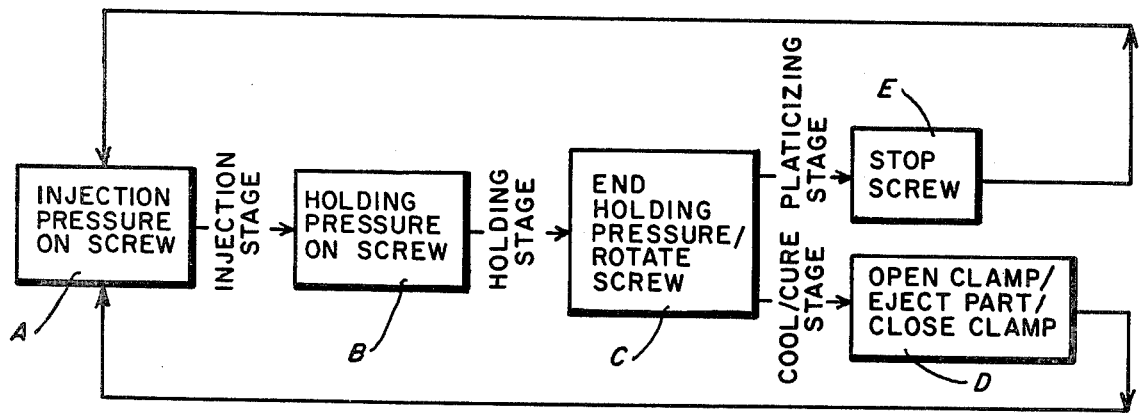
Fig_1

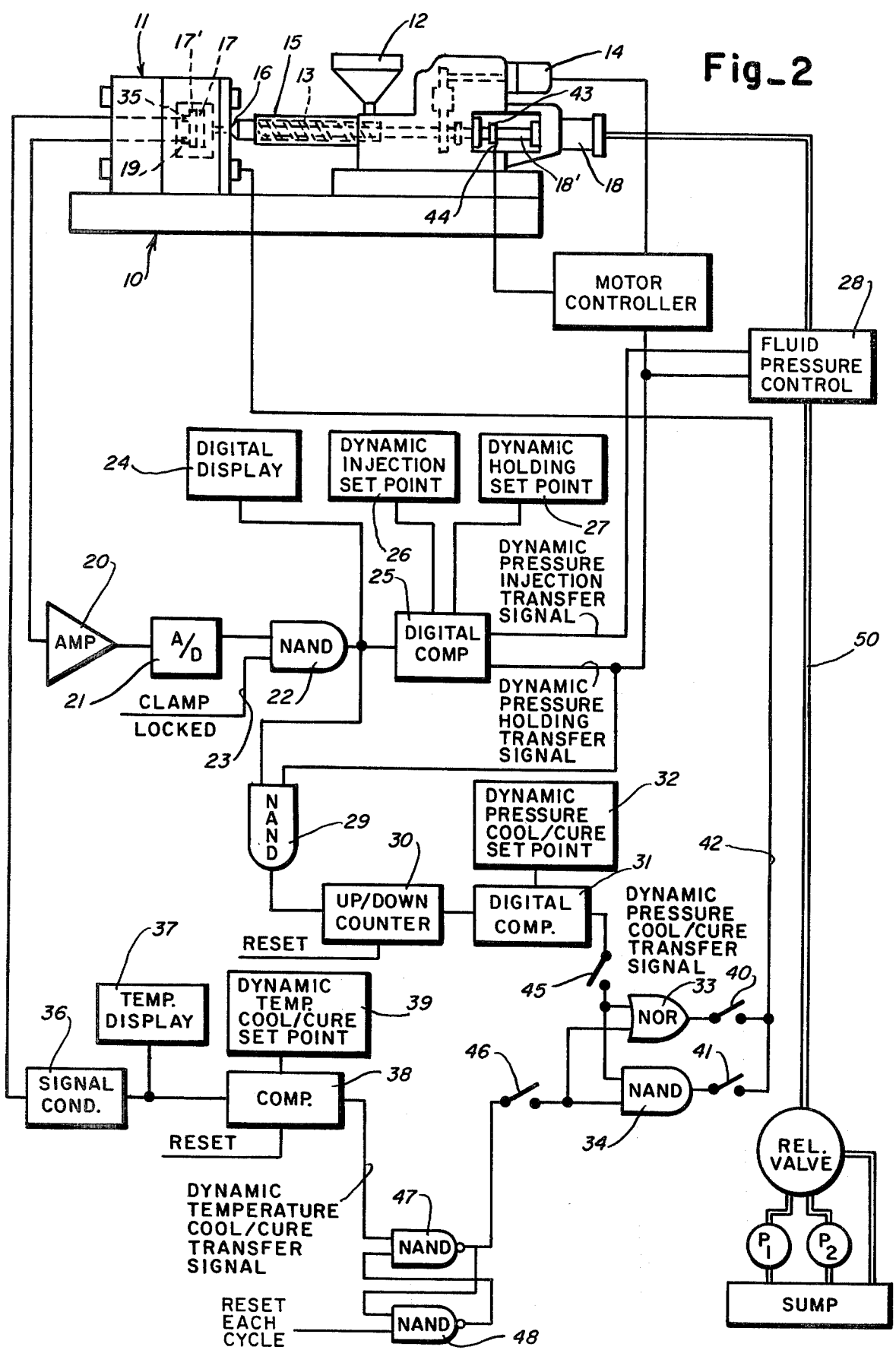
Fig_2

TIME INDEPENDENT CYCLE CONTROL FOR PLASTIC INJECTION MOLDING MACHINES

This present application is a Continuation-In-Part of U.S. patent application Ser. No. 587,043, filed June 16, 1975, now abandoned.

BACKGROUND OF THE INVENTION

Plastic injection molding machines generally follow a standard sequence of operations. The raw plastic material is fed into a cylinder containing a rotating screw. As the screw rotates, it heats and plasticizes the material and forces it to the front end of the barrel. Plastic melt accumulates at the forward end of the barrel and forces the screw backward.

When a sufficient amount of material has accumulated to produce the desired molded article and after the mold parts have been clamped together, the motor rotating the screw is stopped. The screw is then forced forward, injecting plastic melt into the mold cavity. A holding pressure is then maintained on the screw to pack plastic into the mold, completely filling it, and then to solidify the molten plastic. When the part has sufficiently solidified to maintain its shape without external pressure, the holding pressure is reduced, and the screw is again rotated to prepare the next shot. The part is then either cooled or cured in the mold, depending on whether the plastic is thermoplastic or thermosetting. When the plastic has sufficiently solidified and the part is sufficiently formed to be ejected from the cavity, the clamp is opened, and the part is then ejected. When the mold cavity is cleared, the mold is reclamped and the mold cycle can begin again.

In the past, it has been customary in the molding industry to control the initiation and termination of portions of the cycle both in response to some physical parameters, such as the condition of plastic in the mold, and also in response to the elapse of an amount of time from the initiation or termination of some portion of the cycle. An example of the former is the so-called "dynamic transfer" control. In dynamic transfer, the pressure in either the mold cavity or the barrel is monitored, and when this pressure reaches a predetermined value, the hydraulic pressure on the screw is changed from the injection to the holding pressure, thus terminating the injection portion of the cycle and initiating the holding portion of the cycle. Other controls have used pressures, temperatures or other parameters generated during the molding cycle to initiate or terminate various portions of the cycle.

One example of a customarily used time-dependent control is the timing of the holding stage of the cycle, during which the holding pressure is applied to the plastic in the mold. Generally, when dynamic transfer is initiated to change the pressure exerted by the pneumatic cylinder on the screw from the injection to the holding pressure, a pre-set timer is also actuated. When the timer times out, the pressure exerted by the pneumatic cylinder on the screw is reduced and the holding phase is terminated. The screw then starts rotating to prepare the next shot. Similarly, it has been customary to time the cold/cure portion of the cycle, that is, the time between the termination of the holding pressure and unclamping of the mold. Similarly, depending on the sophistication or lack thereof of the molding machine controls it has been customary to time other portions of the molding cycle.

Using a time-dependent measure for starting or terminating various portions of the molding cycle by necessity reduces production rates. Since the set time intervals are empirically determined, and since the actual times required may vary from shot to shot depending on variations in the plastic, safety factors must be used to allow for the worst case, wasting a certain amount of processing time. On the other hand, if such time is not allowed, a large number of poor quality articles may be produced. Thus, the molding machine operator must make the choice between high production and a low rejection rate.

SUMMARY OF THE INVENTION

Briefly stated, the invention comprises a cycle control for plastic injection molding machines having means by which all time-based machine controls are eliminated by initiating or terminating the machine functions in response to actual, physical properties experienced by the machine, or by the plastic or in the mold, rather than in response to elapsed-time intervals. Means are provided for reducing the injection pressure to the hold pressure when the measured or dynamic pressure in the mold cavity reaches a predetermined pressure, means are provided for ending the hold pressure and initiating the cold/cure portion of the cycle by measuring actual, physical conditions of the plastic in the mold, such as pressure or temperature, and means are provided for opening the mold clamp to eject the molded part and thus ending the cold/cure portion of the cycle in response to parameters based on actual, physical properties of the plastic in the mold, such as pressure or temperature. The machine cycle is thereby completely independent of time, thus minimizing cycle time.

OBJECTS OF THE INVENTION

Accordingly, it is an object of the invention to control the molding cycle of a plastic injection molding machine without reference to time to determine when to initiate or terminate various cycle operations.

Yet another object of the invention is to produce molded plastic parts of high quality.

Still another object of the invention is to minimize the time necessary to produce each molded part, thereby maximizing production.

Still another object of the invention is to initiate and terminate each of the operations of the molding machine during the cycle in response to parameters based on the actual, physical properties of the plastic being molded.

Still other objects and many of the attendant advantages of the present invention will become apparent to those skilled in the art from a reading of the following detailed description taken in conjunction with the accompanying drawing.

BRIEF DESCRIPTION OF THE DRAWING

FIG. 1 is a schematic diagram of a generalized plastic injection-molding cycle showing the relationship of the various machine functions and the stages of the cycle.

FIG. 2 is a side view of a typical molding machine in conjunction with a simplified block diagram illustrating means for controlling the molding machine functions independently of time.

DEFINITION

When the phrase "molding conditions" is used in the specification or in the appended claims it is intended to thereby mean either actual, physical properties which result from the operation of the molding machine, such as the length of travel of the screw during plasticizing or injection, or properties of the plastic material throughout the molding cycle such as temperature or pressure in the mold cavity or the screw barrel, or the initiation or termination of functions of the molding machine, such as unclamping or clamping the mold. The phrase is meant to specifically exclude the elapse of a predetermined time interval.

DETAILED DESCRIPTION OF THE PREFERRED EMBODIMENT

Referring to the top of FIG. 2, a typical screw-injection molding machine is illustrated, comprising an elongated bed or frame 10 supporting a mold clamp mechanism 11 at one end and plasticizing and injection means at the other end. Material to be plasticized is introduced in a hopper 12 and is gravity fed to a rearward part of an elongated plasticizing screw 13, rotated by motor means 14 having geared connection to a splined rearward region of screw 13. The direction of screw rotation within its confining barrel 15 is such as to accomplish plasticizing action while advancing the plastic material toward the front (or nozzle) end of barrel 15. A nozzle 16 is shown at the front end of barrel 15 and will be understood to be engaged to the sprue or inlet port of a mold 17 clamped by means 11. The screw 13 is reciprocable on its axis and is forwardly loaded by hydraulic means 18. Fluid pressure is supplied to hydraulic means 18 by pumps $P_1$ and $P_2$, through a relief valve and fluid line 50, and the pressure is controlled by control means 28, as is known in the art. As the screw rotates, plasticized melt accumulates forward of the screw and forces the retraction of the screw until such time as an adequate shot size has been prepared, whereupon motor 14 is stopped, and when the mold cavity 17' has been cleared of the previously molded product and the parts of mold 17 have been clamped together, the feed stroke may proceed under the driving action of hydraulic means 18 on the screw 13. Adequacy of the shot size may be determined by any known means, such as by sensing the rearward motion of the screw by means of lug 43 mounted on a splined portion 18' of the screw to trip a frame based limit switch 44.

Referring to FIG. 1, with further reference to FIG. 2, the typical molding cycle for molding a plastic article on the above-described machine is shown as starting at the point in the cycle, described above, at which the mold has been cleared of the previously molded article and is closed and clamped. Additionally, a sufficient amount of plastic has been built up in front of screw 13, the screw has been stopped, and molding is ready to begin. Injection pressure is first applied by hydraulic cylinder 18 to screw 13, as at position A (FIG. 1), starting the injection stage of the cycle. During this stage, the screw is forced to the left, as shown, under pressure, injecting plastic into the mold. The injection pressure is maintained on screw 13 until the screw has forced the shot of plastic melt into mold cavity 17'. In typical systems, injection pressure may be maintained from 1 to 10 seconds, after which the pressure is changed to the holding pressure, as at position B, ending the injection stage and beginning the holding stage. When molding most articles, the injection pressure is reduced to a lower holding pressure at the end of the injection stage. However, when molding certain articles the injection pressure is increased to a higher holding pressure. For example, when molding optical lenses, due to the nature of the plastic material and in order to prevent distortion in the finished lens, a lower injection pressure is first applied and then a higher holding pressure.

During the holding stage, plastic is packed into the mold cavity, increasing the pressure in the cavity to a maximum. The holding pressure is maintained on the screw, maintaining the pressure on the plastic in the mold cavity, for a sufficient amount of time as set by a timer to allow the plastic to solidify in the mold.

After the plastic has solidified, which generally takes between 1 and 30 seconds, the holding pressure on the screw is reduced to a lower loading pressure as at position C, ending the holding stage and beginning the cold/cure stage which is typically maintained over an interval set by a timer. The screw is then again rotated by actuating motor 14, and plasticizing of material for the next shot gets underway while a molded product is in the mold undergoing cold/cure.

During the cold/cure stage, the plastic is cooled (in the case of a thermoplastic) or heated (in the case of thermosetting plastic) so that it solidifies to allow it to be ejected from the mold. When the molded part has sufficiently cooled to be ejected without deformation, as determined by the cool/cure timer, the clamp is opened, as at position D, ending the cool/cure. The molded part is then ejected, as rapidly as possible, and the mold is clamped as soon as the part is ejected. At this point in the molding cycle, the screw may or may not have already prepared a shot of sufficient size to begin the next molding cycle, depending on the amount of time necessary to prepare the shot and on the amount of time necessary to cool or cure the previously molded product. When the screw has had time to build up a sufficient amount of plastic for the next shot, the screw is stopped, as at position E. When both the next shot is ready and the mold is clamped, the next molding cycle may begin. Thus in typical prior art injection molding systems, timers to establish the duration of the holding and cool/cure stages are set according to predetermined times found necessary and which usually are not thereafter varied from cycle to cycle.

In accordance with the invention, transducers are employed to monitor pressure and/or temperature within the mold cavity and when these parameters reach predetermined magnitudes, resulting in transfer signals, switching from stage to stage of the molding machine cycle ensues. With particular reference again to FIG. 2, a pressure transducer 19 and a temperature transducer 35, both of conventional design, are shown in position in the wall of mold 17 to measure the pressure and temperature within the mold cavity 17'. The output of transducer 19 is a signal representative of the "dynamic" cavity pressure, that is, the actual pressure at any given time in the mold cavity during injection and molding of the plastic. Similarly, the output of temperature transducer 35 is a signal representative of the dynamic cavity temperature.

The output of pressure transducer 19 is amplified by an amplifier 20 and applied to an analog-to-digital converter 21 which converts the analog dynamic pressure signal to a digital signal. The digitalized pressure signal is then applied to a nand gate 22, together with an enabling signal from enabling input 23. When clamp means 11 is locked, a signal is applied to enabling input 23, enabling nand gate 22 to gate the digitalized pressure signal to digital display 24, where the pressure signal is displayed, and to digital comparator 25. The digitalized dynamic pressure is compared in comparator 25 to a dynamic injection set pressure, set into dynamic pressure injection set point 26. Dynamic pressure injection set point 26 is preferably a digital read-out counter which may be set manually to a predetermined dynamic injection set pressure by the machine operator. The dynamic injection set pressure is the pressure reached in the mold cavity during injection at which it is insured that the shot will completely fill the mold cavity if the predetermined holding pressure is maintained on the screw and at which the injection pressure can thus be changed to the holding pressure. This pressure is generally lower than the maximum pressure in the cavity primarily since the cavity has not been completely filled with plastic. The desired dynamic injection set pressure is generally empirically determined by the machine operator and varies depending on such factors as the type of plastic being molded and individual variations within each shot. When the value of the digitalized dynamic pressure reaches the value set in dynamic pressure injection set point 26, comparator 25 initiates a dynamic pressure injection transfer signal, causing fluid pressure control 28 to increase or reduce the pressure in line 50 by either adding or dropping booster pump $P_1$ from line 50. Hydraulic pressure is thus increased or decreased by cylinder 18 on screw 13, changing the pressure on the screw from the injection pressure to the holding pressure. The injection stage is thus terminated and the holding stage is initiated.

The digitalized dynamic pressure is also compared by comparator 25 with the dynamic holding set pressure, set in dynamic holding pressure set point 27. The dynamic holding set pressure is the pressure in the mold cavity after injection at which it is insured that the plastic in the mold has sufficiently solidified to maintain its shape or not be otherwise adversely affected without the external holding pressure exerted by the screw. Dynamic holding pressure set point 27 is similar in construction to dynamic pressure injection set point 26, and the holding pressure is similarly empirically determined by the machine operator. When the value of dynamic pressure gated by nand gate 22 to comparator 25 reaches the value set in dynamic pressure holding set point 27, comparator 25 initiates a dynamic pressure holding transfer signal, reducing the pressure exerted by cylinder 18 on screw 13, and ending the holding stage of the machine cycle. The dynamic pressure holding transfer signal also starts rotation of screw 13, preparing plasticizing material for the succeeding shot and starting the plasticizing stage.

The digitalized dynamic pressure signal which is gated by nand gate 22 to display 24 and comparator 25 is also gated to another nand gate 29. In addition, the dynamic pressure holding transfer signal is applied to nand gate 29 to enable the gate only after the reduction of the holding pressure on screw 13. When the dynamic pressure holding transfer signal is initiated and pressure on the screw has been reduced, nand gate 29 gates the digitalized dynamic pressure signal to up/down counter 30. Since the pressure in the mold cavity drops as the molded plastic shrinks during cooling or curing, the higher dynamic pressure will fall to meet a lower set pressure when the molded part has been adequately cooled or cured. Thus, the dynamic pressure is counted down from counter 30 for comparison with the dynamic cool/cure set pressure. The output of counter 30 is applied to digital comparator 31, where the digitalized dynamic pressure is compared with the dynamic cool/cure set pressure, set in dynamic pressure cool/cure set point 32. The dynamic cool/cure set pressure is the pressure in the mold cavity after injection at which it is insured that the plastic in the mold has sufficiently solidified to be ejected without deforming or otherwise adversely affecting the molded article. Dynamic pressure cool/cure set point 32 is similar in construction to dynamic pressure injection set point 26, and the pressure set into cool/cure set point 32 is similarly generally empirically determined by the molding machine operator. When the digitalized dynamic pressure counted down from counter 30 reaches the dynamic cool/cure set pressure, digital comparator 31 initiates the dynamic pressure cool/cure transfer signal which is applied through switch 45 to nor gate 33 and nand gate 34.

Also applied to these gates is the dynamic temperature cool/cure transfer signal, generated in response to the dynamic temperature signal. The dynamic temperature signal, representative of the temperature in the mold at any given time, is generated by temperature transducer 35. The dynamic temperature signal is conditioned by signal conditioning means 36, displayed by display 37, and compared in comparator 38 to a desired temperature set in dynamic temperature cool/cure set point 39. The dynamic cool/cure set temperature is the temperature in the mold cavity after injection at which it is insured that the plastic in the mold has sufficiently solidified to be ejected without deforming or otherwise adversely affecting the molded part. Dynamic temperature set point 39 is similar in construction to dynamic pressure injection set point 26. When the conditioned dynamic temperature signal equals the value set in dynamic temperature set point 39, comparator 38 initiates the dynamic temperature cool/cure transfer signal which is applied to nand gate 47. The gate 47 functions to hold the transfer signal until such time that digital comparator 31 initiates a dynamic pressure cool/cure transfer signal as detailed above. After each machine cycle, a reset pulse is applied to nand gate 48. The output from nand gate 48 is applied as an input to gate 47, and the output of nand gate 47 is applied as an input to gate 48, and through switch 46 to nor gate 33 and nand gate 34, when switch 46 is closed.

Switches 45 and 46 are provided in series with the lines carrying the dynamic pressure cool/cure transfer signal and the dynamic temperature cool/cure transfer signal, respectively. Switches 45 and 46 are manually operated by the machine operator. By closing either or both switches 45 and 46, the machine operator can select any of three modes of operation for unclamping mold 17. If switch 45 is closed and switch 46 is opened, clamp means 11 will respond only to initiation of the dynamic pressure cool/cure transfer signal. If switch 46 is closed and switch 45 is opened, clamp means 11 will respond only to initiation of the dynamic temperature cool/cure transfer signal. If both switches 45 and 46 are closed, the clamp means is capable of being opened on initiation of either the dynamic pressure cool/cure transfer signal, the dynamic temperature cool/cure transfer signal, or only on initiation of both the dynamic cool/cure transfer signals.

Switches 40 and 41 are provided in series with the outputs of nor gate 33 and nand gate 34, respectively. Switches 40 and 41 are manually operated by the machine operator. When switch 40 is closed, nor gate 33 gate either the dynamic pressure cool/cure transfer signal or the dynamic temperature cool/cure transfer signal through line 42, opening clamp means 11. Thus, when switch 40 is closed, the clamp is opened when either the dynamic pressure in the mold cavity falls to the desired transfer pressure or when the dynamic temperature in the mold cavity falls to the desired transfer temperature. When switch 41 is closed and switch 40 is opened, nor gate 33 is disabled and nand gate 34 gates input signals through line 42. Thus, in this mode, nand gate 34 gates a signal through line 42 only when the gate is enabled by both the dynamic pressure cool/cure transfer signal and the dynamic temperature cool/cure transfer signal. This insures both that the molded part has reached a predetermined temperature and that the pressure in the mold cavity is below a predetermined value. This is particularly critical for molding certain types of plastics, such as nylon, which make a definite and severe transition between the liquid and solid states within a relatively small temperature range. By monitoring the temperature and pressure in the mold cavity, a completely solidified plastic article is assured before the clamp is opened.

When either the dynamic pressure cool/cure transfer signal or the dynamic temperature cool/cure transfer signal is gated by nor gate 33 or when both signals are gated by nand gate 34 through line 42, the cool/cure stage is terminated. Clamp means 11 is opened, and the molded part is ejected from the mold cavity 17', as rapidly as permitted by the machine, after which the mold is clamped together again, as rapidly as permitted by the machine, readying the mold for the next molding cycle.

In operation, to mold a plastic article with the controls of the invention, the machine operator must first set up the machine controls to produce the optimum molded parts, depending on such conditions such as the characteristics of the plastic to be molded, the shape of or structural characteristics of the part to be produced, and the configuration of the mold cavity. Thus, the machine operator determines and sets into the machine controls the optimum injection pressure (or pressure profile), the holding pressure and cool/cure pressure and temperature. Also the machine operator selects the mode of operation best suited to the particular molding operation by setting switches 45, 46, 40 and 41. The operator then initiates the molding cycle, by means not shown but well known in the art, and the molding process then proceeds as previously described.

It is to be noted that, for the sake of simplicity, known time-independent cycle controls and recycling means such as that shown in U.S. Pat. No. 3,359,691 to W. B. Evans and U.S. Pat. No. 3,628,901 to D. C. Paulson have been omitted from the detailed description of the invention. The invention may be used in combination with these or any known time-independent controls.

The invention has been described as using the pressure and temperature in the mold cavity to initiate or terminate several machine functions which were previously responsive to time-dependent controls. It is to be noted that the invention contemplates molding control apparatus which is responsive to any parameters based on actual molding conditions, such as pressures or temperatures at the screw nozzle or in the screw barrel, or the back pressure on the hydraulic means.

Thus, a cycle control for plastic injection molding machines has been described in which all time-responsive machine controls are eliminated by initiating or terminating all machine functions in response to actual physical properties experienced by the machine or by the plastic in the mold.

I claim:

1. Apparatus for controlling a cyclically operated screw-injection plastic molding machine having a screw reciprocably and rotatably mounted within a barrel, means for feeding raw plastic material into said barrel, means for rotating said screw to plasticize and advance said plastic material toward a sprue located at one end of said barrel, said sprue communicating with a mold having a cavity of predetermined form, means for clamping the mold together, whereby the mold cavity assumes said predetermined form, means for forcing said screw toward said sprue whereby said plasticized plastic material which has accumulated in said barrel is injected through the sprue into the mold cavity to form a molded plastic part, means for applying pressure to the screw to hold the plastic in the cavity until the plastic solidifies, and means for unclamping said mold whereby said molded article may be removed therefrom and said molding machine may be recyclably operated, the improvement comprising:

a pressure transducer for generating mold cavity pressure signals, a first comparator means for comparing mold cavity pressure signals with a first predetermined value representative of the pressure in the mold cavity during injection which insures that the plastic fills the mold cavity, said comparator means generating a first coincidence signal, first pressure control means for changing the pressure applied to the screw from an injection pressure to a holding pressure in response to said first coincidence signal, a second comparator means for comparing said cavity pressure signals with a second predetermined value representative of the pressure in the mold cavity after injection to insure that the plastic has sufficiently solidified so that the holding pressure on the screw may be reduced and for generating a second coincidence signal, second pressure control means for reducing the pressure applied to the screw from said holding pressure in response to said second coincidence signal, a third comparator means for comparing said cavity pressure signals with a third predetermined value representative of the pressure in the mold cavity after injection at which the molded plastic is sufficiently solidified to be ejected from the mold and for generating a third coincidence signal, a temperature transducer for generating signals representing part temperatures in the mold cavity, a fourth comparator means for comparing generated temperature signals with a predetermined value representative of the temperature at which the molded plastic can be ejected from the mold and for generating a fourth coincidence signal, means for unclamping the mold and ejecting the molded part, and gate means for holding the first occurring of the third and fourth coincidence signals until the last occurring of the third and fourth coincidence signals whereby the mold is unclamped and the part is ejected only after the cavity pressure and the cavity temperature have both achieved predetermined values.

* * * * *